(12) United States Patent
Grabau et al.

(10) Patent No.: US 6,451,154 B1
(45) Date of Patent: *Sep. 17, 2002

(54) RFID MANUFACTURING CONCEPTS

(75) Inventors: Robert E. Grabau, North Tonawanda; Nancy G. Mitchell, Grand Island; Thomas P. Nash, Getzville; Eric V. Palmer, Amherst; Adele C. Shipston, Williamsville; John R. Soltysiak, Blasdell, all of NY (US)

(73) Assignee: Moore North America, Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/506,577

(22) Filed: Feb. 18, 2000

(51) Int. Cl.$^7$ .............................................. B32B 31/08
(52) U.S. Cl. ...................... 156/300; 156/555; 156/582; 257/679; 340/572.1; 29/738
(58) Field of Search ................................ 156/290, 291, 156/293, 295, 799, 300, 555, 580–581, 582; 257/679, 723–724, 778; 361/737; 340/825.34, 572.1; 29/738–740

(56) References Cited

U.S. PATENT DOCUMENTS

| | | | |
|---|---|---|---|
| 5,206,626 A | | 4/1993 | Minasy et al. |
| 5,448,118 A | | 9/1995 | Tuttle et al. |
| 5,497,140 A | | 3/1996 | Tuttle |
| 5,528,222 A | * | 6/1996 | Moskowitz et al. ........ 340/572 |
| 5,867,102 A | * | 2/1999 | Souder et al. .............. 340/572 |
| 5,938,880 A | | 8/1999 | Downing et al. |
| 5,973,600 A | | 10/1999 | Mosher, Jr. |
| 6,018,299 A | | 1/2000 | Eberhardt |
| 6,040,773 A | | 3/2000 | Vega et al. |
| 6,091,332 A | | 7/2000 | Eberhardt et al. |
| 6,094,138 A | | 7/2000 | Eberhardt et al. |
| 6,107,920 A | | 8/2000 | Eberhardt et al. |
| 6,107,921 A | | 8/2000 | Eberhardt et al. |
| 6,130,613 A | * | 10/2000 | Eberhardt et al. ........ 340/572.7 |
| 6,147,604 A | * | 11/2000 | Wiklof et al. ............ 340/572.1 |
| 6,147,605 A | | 11/2000 | Vega et al. |
| 6,147,662 A | * | 11/2000 | Grabau et al. .............. 343/895 |
| 6,157,300 A | | 12/2000 | Quaderer et al. |
| 6,265,977 B1 | * | 7/2001 | Vega et al. .............. 340/572.7 |

FOREIGN PATENT DOCUMENTS

| | | |
|---|---|---|
| DE | 197 58 448 | 3/1999 |
| EP | 0 350 235 | 1/1990 |
| EP | 0 720 123 | 7/1996 |
| FR | 2 760 209 | 9/1998 |
| WO | WO 99/65006 | 12/1999 |

* cited by examiner

*Primary Examiner*—Michael W. Ball
*Assistant Examiner*—Jessica Rossi
(74) *Attorney, Agent, or Firm*—Nixon & Vanderhye PC

(57) ABSTRACT

Radio frequency identification labels are made in a high speed and effective manner in a variety of different ways utilizing a number of different sources of RFID inlets, each inlet including an antenna and a chip. A plurality of webs are matched together and RFID labels are die cut from the webs, to produce lined RFID labels. Alternatively linerless RFID labels are produced from a composite web with a release material on one face and pressure sensitive adhesive on the other, the labels formed by perforations in the web.

18 Claims, 11 Drawing Sheets

RFID MANUFACTURING CONCEPTS

BACKGROUND AND SUMMARY OF THE INVENTION

RFID (radio frequency identification) labels are becoming more widely used for a wide variety of purposes, such as shown in U.S. Pat. Nos. 5,206,626, 5,448,110, and 5,497,140. The more inexpensively and quickly the RFID labels can be made, the even more widespread their appeal will be because they will be able to be cost effectively incorporated into numerous products and environments.

According to the present invention a method of making RFID labels is provided which has optimum versatility, and can effectively produce a wide variety of different types of RFID labels (including lined or linerless labels) in a cost effective manner. The RFID labels may be made according to the present invention at high speed, typically at speeds of at least about 100 feet per minute, utilizing conventional web handling equipment.

According to one aspect of the present invention a method of making RFID labels is provided comprising: (a) Providing a plurality of RFID inlets, each including a chip (and antenna), on a first web. (b) Covering the RFID inlets with a second web to provide a composite web. (c) Providing pressure sensitive adhesive on a portion of one of the webs that will be an exterior portion of a label once ultimately formed. (d) At least one of verifying the functionality of, or programming, the chips prior to formation of the composite web. And, (e) acting on the composite web so as to provide the composite web into labels having a top face, and a bottom face with pressure sensitive adhesive. The method may further comprise (f) imaging variable indicia on the top face. High speed practice of the method is possible; that is (a)–(e) may be practiced at a rate of at least about 100 feet per minute (e.g. up to about 300 ft./min.). Also typically (f) is practiced after (e).

The method is very versatile, and a wide variety of different materials and procedures may be utilized in the practice of the invention. For example (a) may be practiced using a paper web as the first web, and (b) may be practiced using transfer tape, or a liner which is coated with pressure sensitive adhesive prior to engagement between the webs, as the second web. Alternatively (a) may be practiced using RFID film, in which case typically (b) is practiced by separating the face stock and liner of a label laminate, and using one of the face stock or liner as the second web and the other as a third web; and further comprising, after (b), (g) laminating the third web onto the second web by passing the webs between laminating rolls to sandwich the chips between the second and third webs. The method may also further comprise (h) forming openings or recesses in the third web aligned with the inlets, in which case (g) is further practiced by ensuring that the inlets enter the openings or recesses in the third web. That is (g) may be practiced by die cutting openings in the third web, or by calendering recesses in the third web.

The method may also further comprise sensing the RFID chips of the inlets prior to formation of the composite web so as to establish a registration signal for what will become each label. Also (b) may be practiced by laminating the first and second webs by passing them between laminating rolls without harming the inlets. Further (b) may be practiced by laminating the first and second webs by passing them between laminating rolls without harming the webs, such as by providing a recess in at least one of (and perhaps both of) the laminating rolls in alignment with the inlets, or by providing a deformable covering on at least one (preferably both) of the laminating rolls so that the deformable covering deforms when contacting the inlets. Also, (b) may be practiced by cutting the first web to provide separate sheets each having an inlet, and placing the sheets onto the second web, and by placing the sheets onto adhesive on the second web.

In the method (e) may be practiced by die cutting the labels from one of the webs to provide a plurality of labels and matrix material on a liner, and removing the matrix material from the labels on the liner. Also they may further comprise making a final RFID chip read verification after (e). The method may further comprise applying a coating of adhesive release material to one of the webs, opposite the pressure sensitive adhesive; and wherein (e) is practiced by perforating the composite web to form a plurality of linerless labels.

According to another aspect of the present invention a method of making RFID labels is provided comprising: (a) Providing a plurality of RFID inlets, each including a chip, on a first web. (b) Covering the RFID inlets with a second web. (c) Laminating a third web onto the second web by passing the webs between laminating rolls to sandwich the inlets between the second and third webs without harming the inlets, to provide a composite web. (d) Providing pressure sensitive adhesive on a portion of one of the webs that will be an exterior portion of a label once ultimately formed. And, (e) acting on the composite web so as to provide the composite web into labels having a top face, and a bottom face with pressure sensitive adhesive. The details of the procedure set forth above may be as described above. Also the method may further comprise applying heat expandable microspheres on the chips, and heating the microspheres to expand the microspheres to produce a cushion.

According to yet another aspect of the present invention there is provided a method of making RFID labels, comprising: (a) Providing a plurality of RFID inlets, each having a chip and antenna, on a composite web. (b) Providing pressure sensitive adhesive on a portion of one of the composite web that will be an exterior portion of a label once ultimately formed. (c) At least one of verifying the functionality of, or programming, the chips prior to formation of the composite web. (d) Sensing the RFID chips prior to formation of the composite web so as to establish a registration signal for what will become each label. (e) Acting on the composite web so as to provide the composite web into labels having a top face, and a bottom face with pressure sensitive adhesive. (f) Imaging variable indicia on the top face. And, (g) after (e) making a final RFID chip read verification.

The invention also comprises RFID labels made by any of the method procedures as described above.

It is the primary object of the present invention to quickly, easily, and cost effectively produce REID labels, for a wide variety of uses. This and other objects of the invention will become clear from an inspection of the detailed description of the invention and from the appended claims.

DETAILED DESCRIPTION OF THE DRAWINGS

Figure 3:
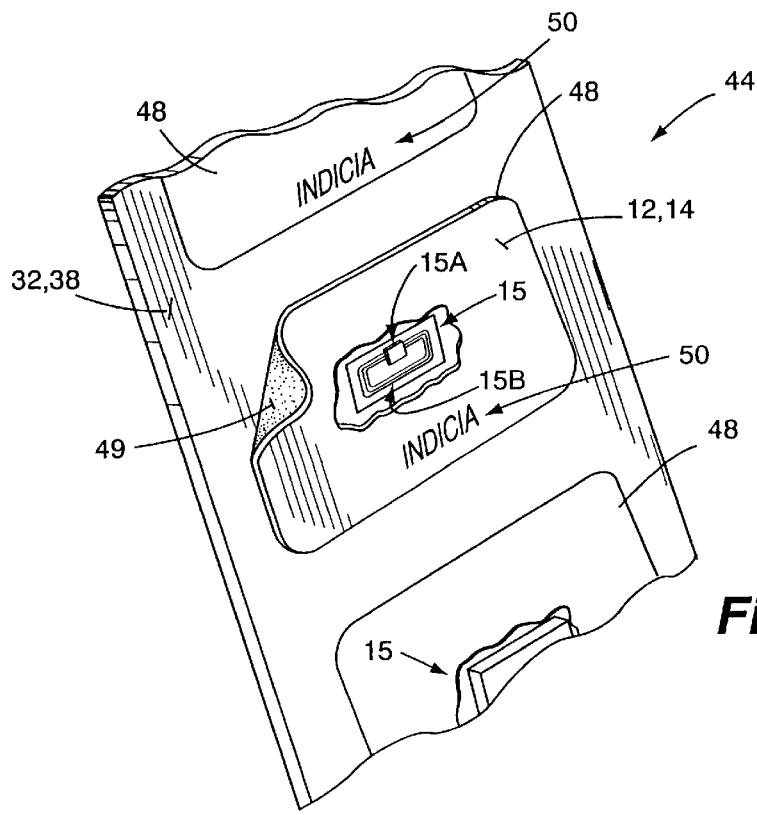
FIG. 3 is a perspective schematic view showing the final RFID labels produced practicing the method of FIG. 1, with one of the labels being shown as being peeled away from the substrate.
Figure 12:
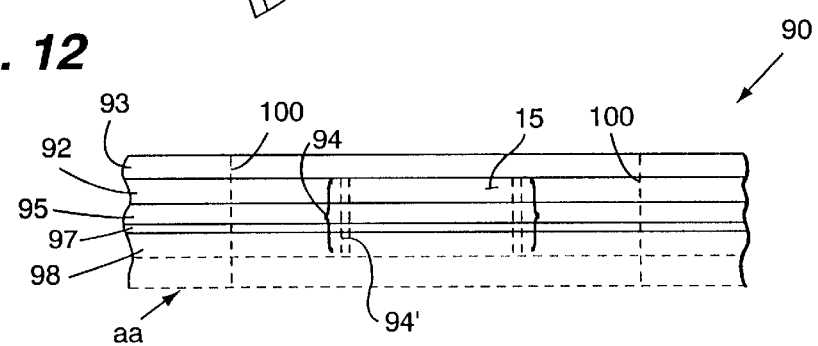
FIG. 12 is a schematic side view showing an exemplary linerless label web that is made pursuant to the method of FIG. 11.

Each of the embodiments of FIGS. 1, 4, 7 through 11, 13 and 14 illustrate different configurations of equipment, and different starting materials. The embodiments of FIGS. 1, 4, and 7 through 10 make lined RFID labels, such as shown in FIG. 3, while the embodiments of FIGS. 11, 13 and 14 make linerless RFID labels, such as shown in FIG. 12. The differences in starting materials between the various embodiments are clear from the following Table I.

If desired the optional equipment 18 for print expandable microspheres onto the chips 15A may be provided, such as shown in co-pending U.S. application Ser. No. 09/393,291 filed Sep. 10, 1999, the disclosure of which is hereby incorporated by reference herein. After the microspheres are applied they are heated by a conventional heater 19 which expands them so as to form a cushion for the chip 15A to protect it during subsequent production handling, and when it is being used.

Ultimately the web 12 passes to a lamination stage 20 where a pair of laminating rollers 21, 22 are provided through which the paper web 12, and a second web (either 32 or 38) are passed to produce a lamination at 20. The lamination must be effected without damaging the chips 15A. One way that this may be accomplished is by utilizing the particular rollers illustrated in FIG. 2.

Figure 1:
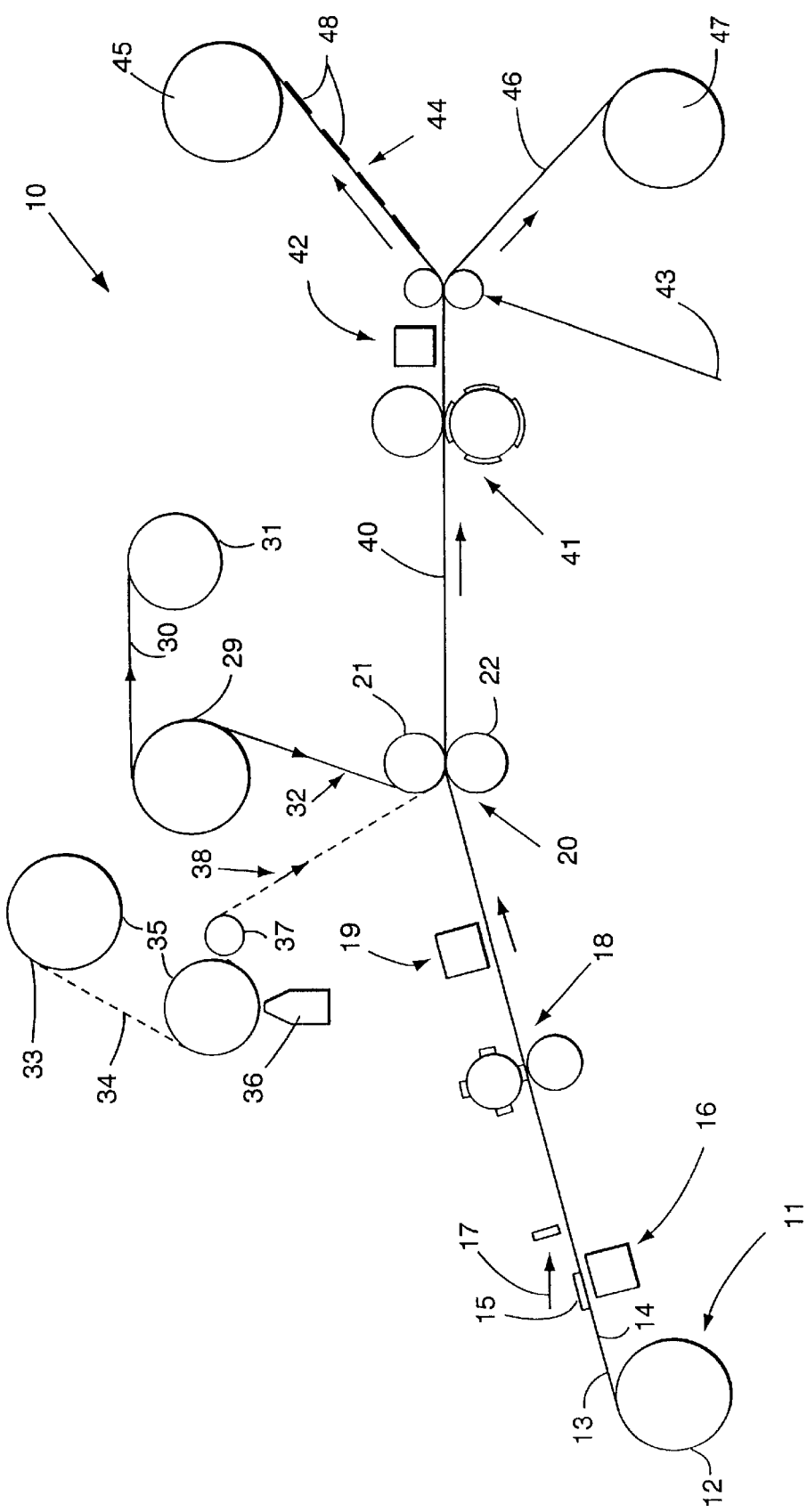
FIG. 1 is a schematic view of exemplary apparatus for practicing one embodiment of the method according to the present invention.
Figure 2:
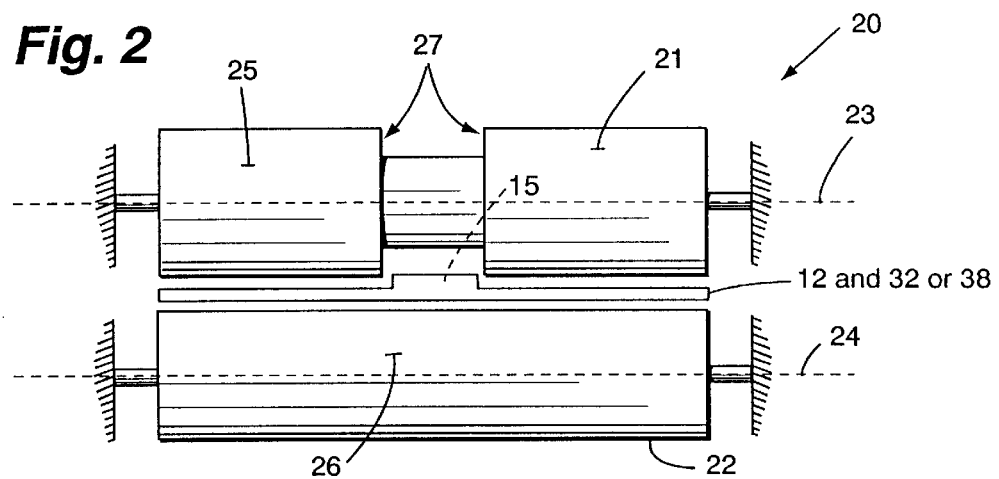
FIG. 2 is a schematic end view of a laminating roller that may be utilized in the practice of the method of FIG. 1.

In FIG. 2 the laminating rollers 21, 22 are shown schematically, rotatable about substantially parallel axes 23, 24, respectively, with the webs passing therebetween. The first roller 21 has a main body portion 25 while the second roller 22 is a main body portion 26, the portions 25, 26 cooperating together to apply pressure so as to laminate the web 12 to another web (32 or 38). In order to accommodate the inlets 15, a recess 27 is provided in the roller 21, aligned with the inlets 15. As shown in FIG. 2 only the roll 21 is recessed, but if desired the roll 22 also can be recessed. Further, while the recess 27 illustrated in FIG. 1 is shown as continuous, where there is a proper control of timing between the various elements the recess 27 may be a plurality of interrupted recesses around the periphery of the

TABLE I

Figure 4:
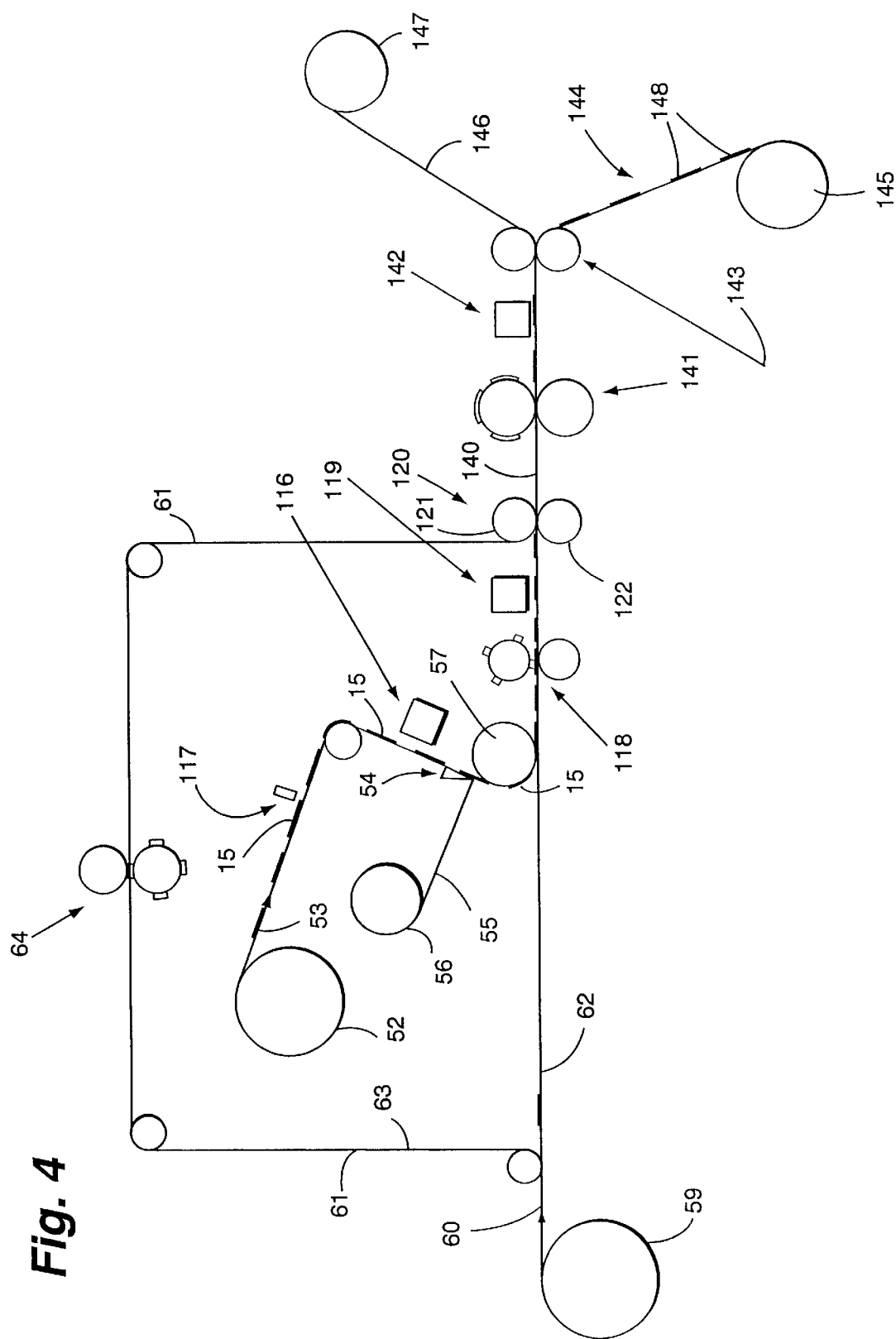
FIG. 4 is a view like that of FIG. 1 only showing a second embodiment of a method according to the present invention.
Figure 7:
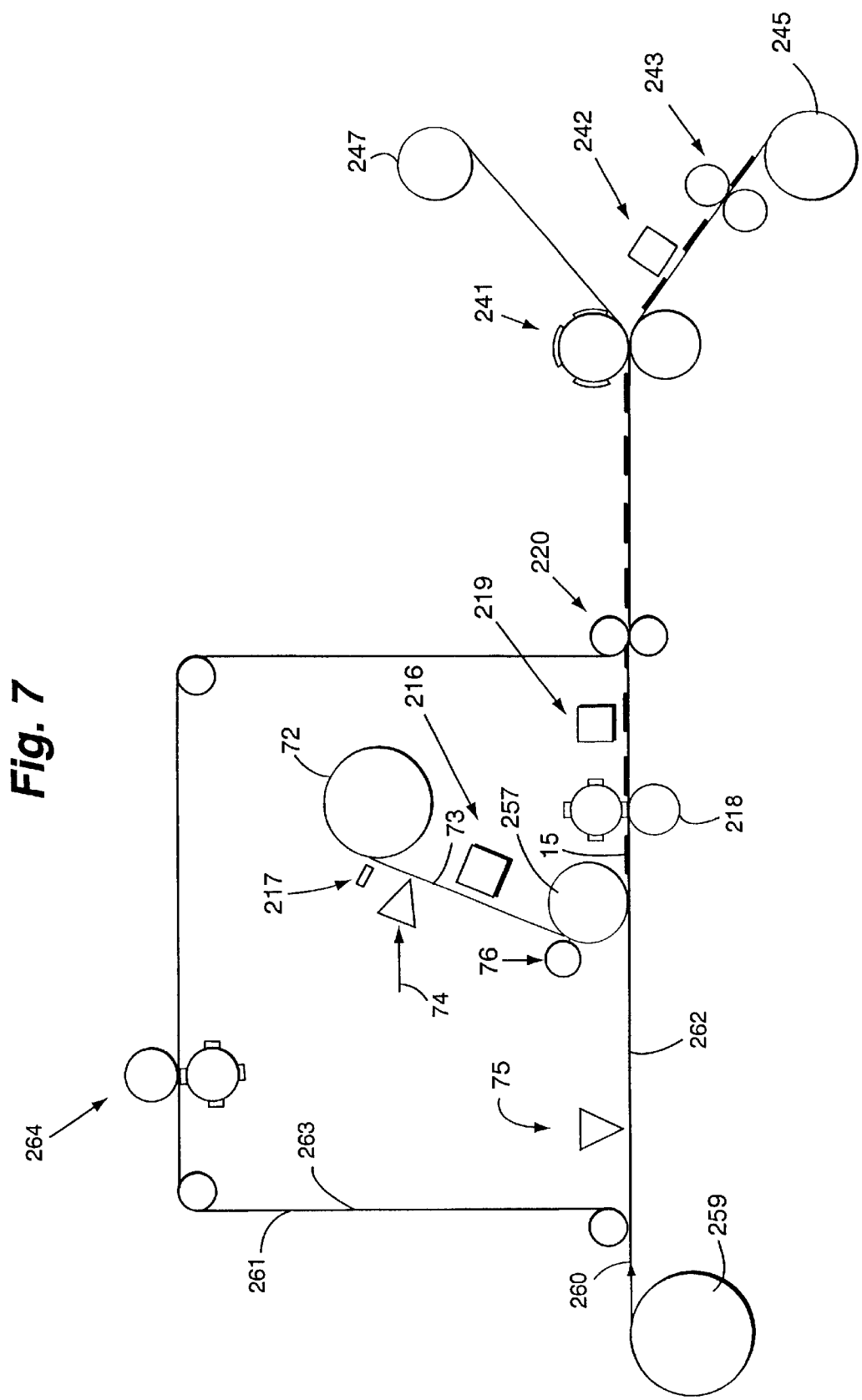
FIGS. 7 through 11 are views like that of FIG. 1 only showing different embodiments of exemplary methods according to the present invention.
Figure 8:
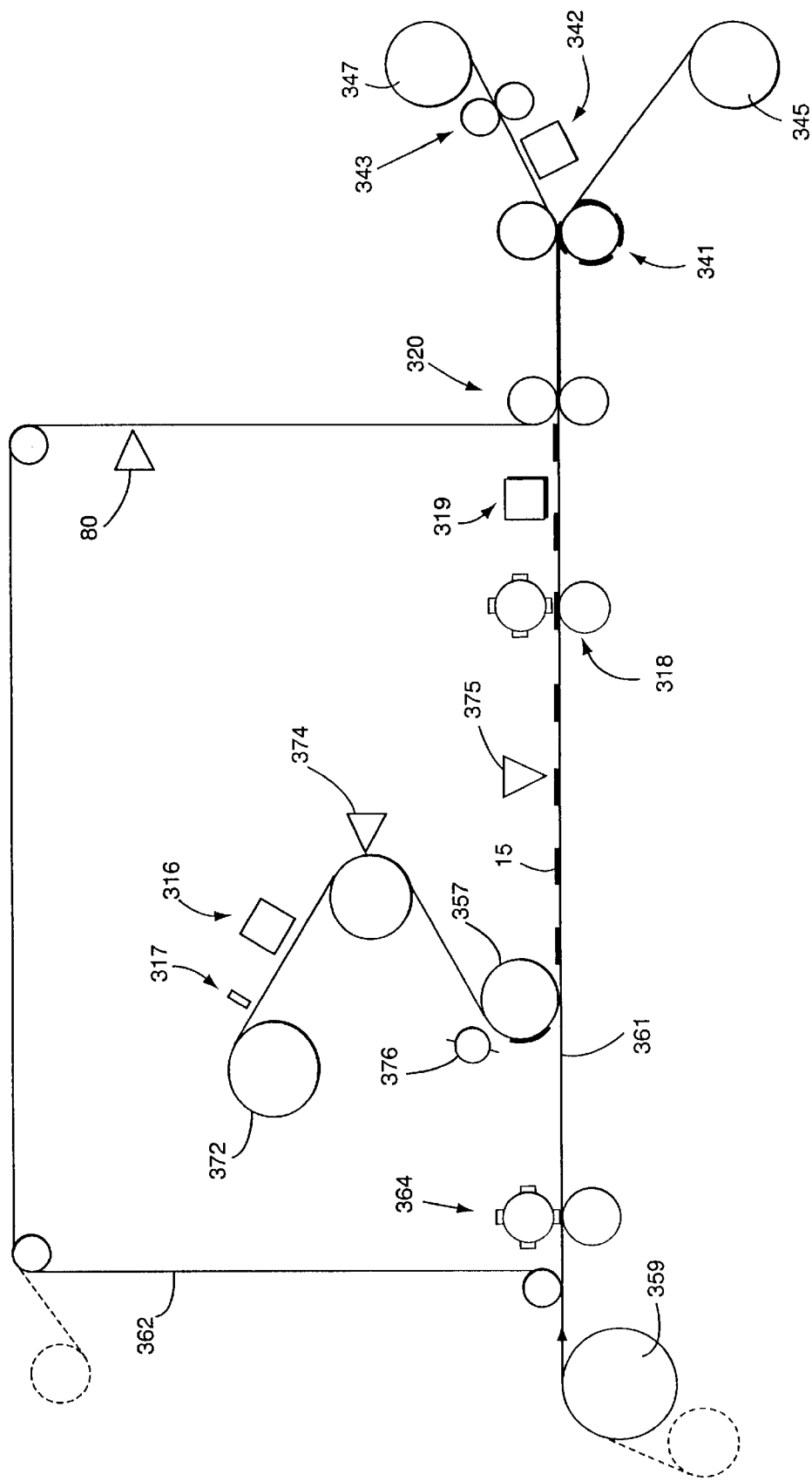
Figure 9:
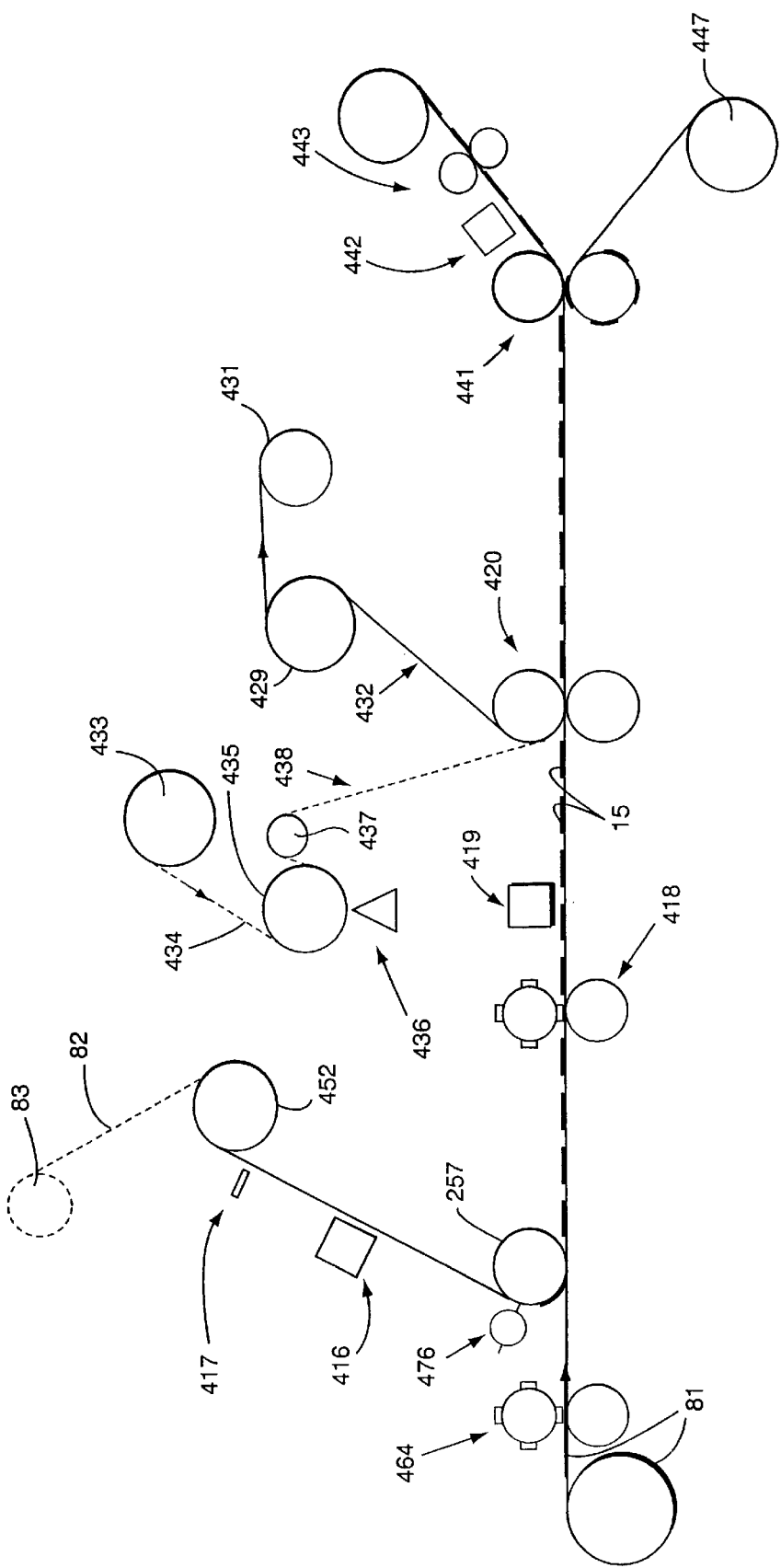
Figure 10:
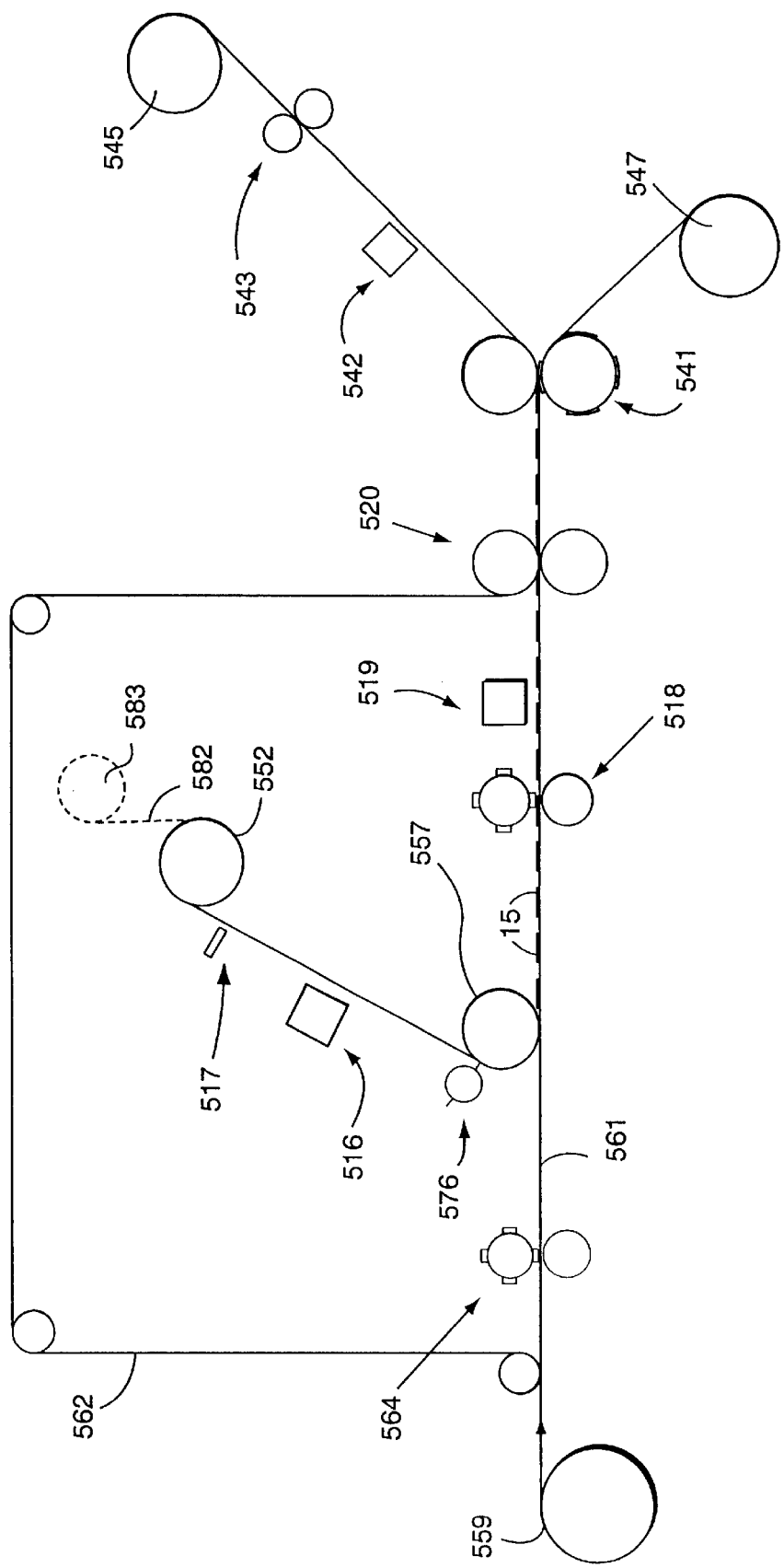
Figure 11:
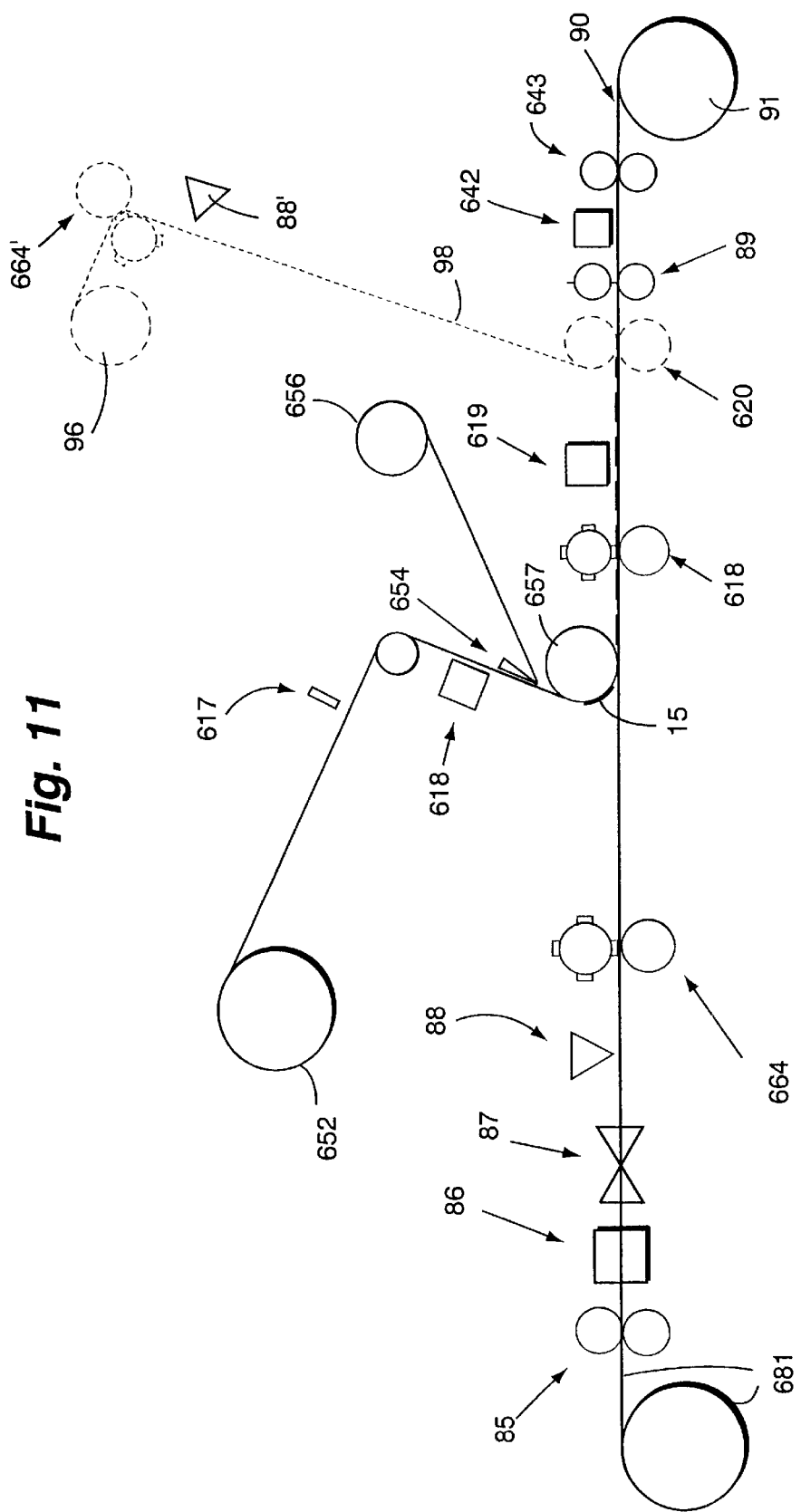
Figure 13:
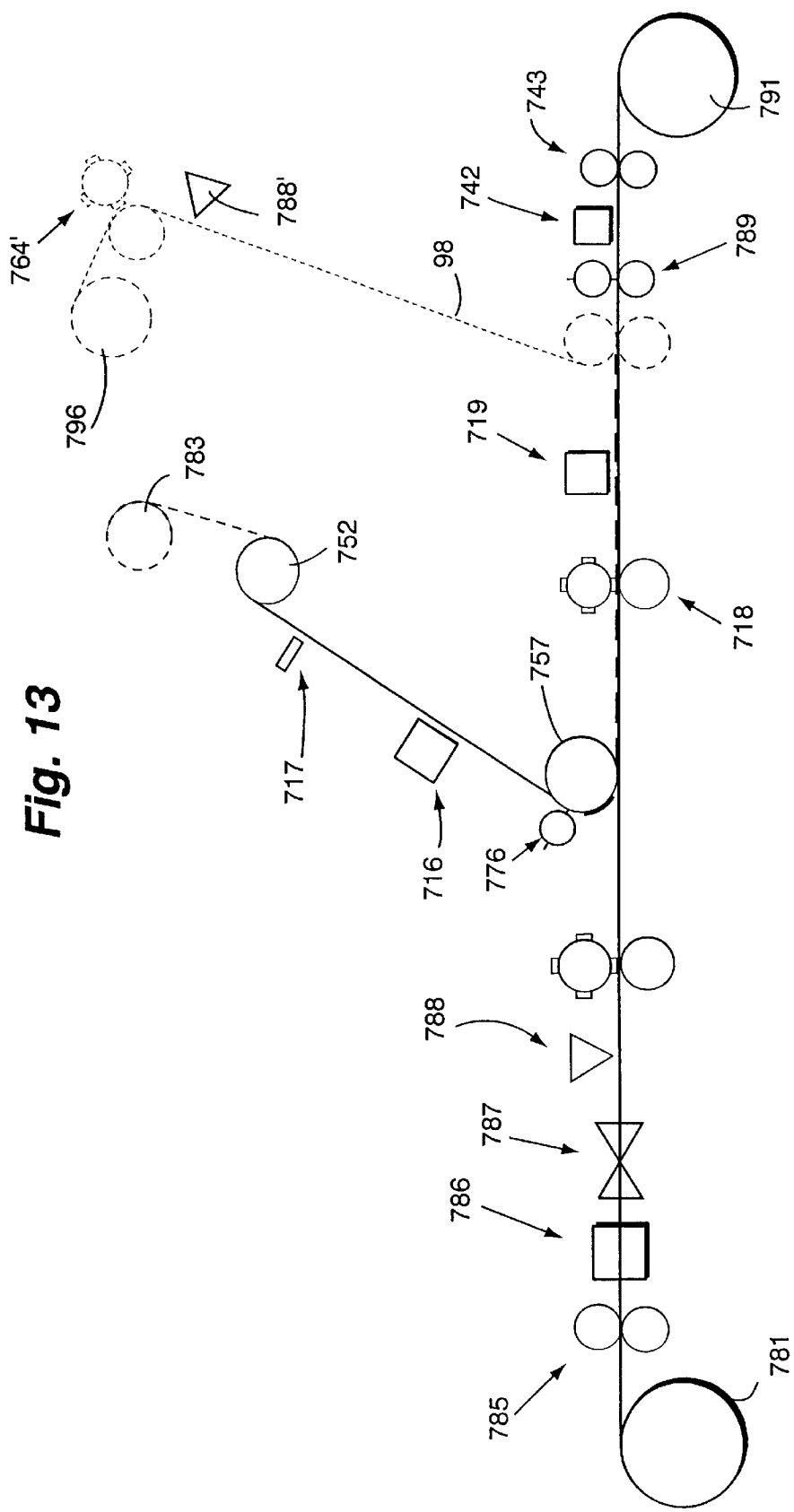
FIGS. 13 and 14 are views like that of FIG. 12 only showing alternative embodiments for making linerless RFID label webs such as illustrated in FIG. 12.
Figure 14:
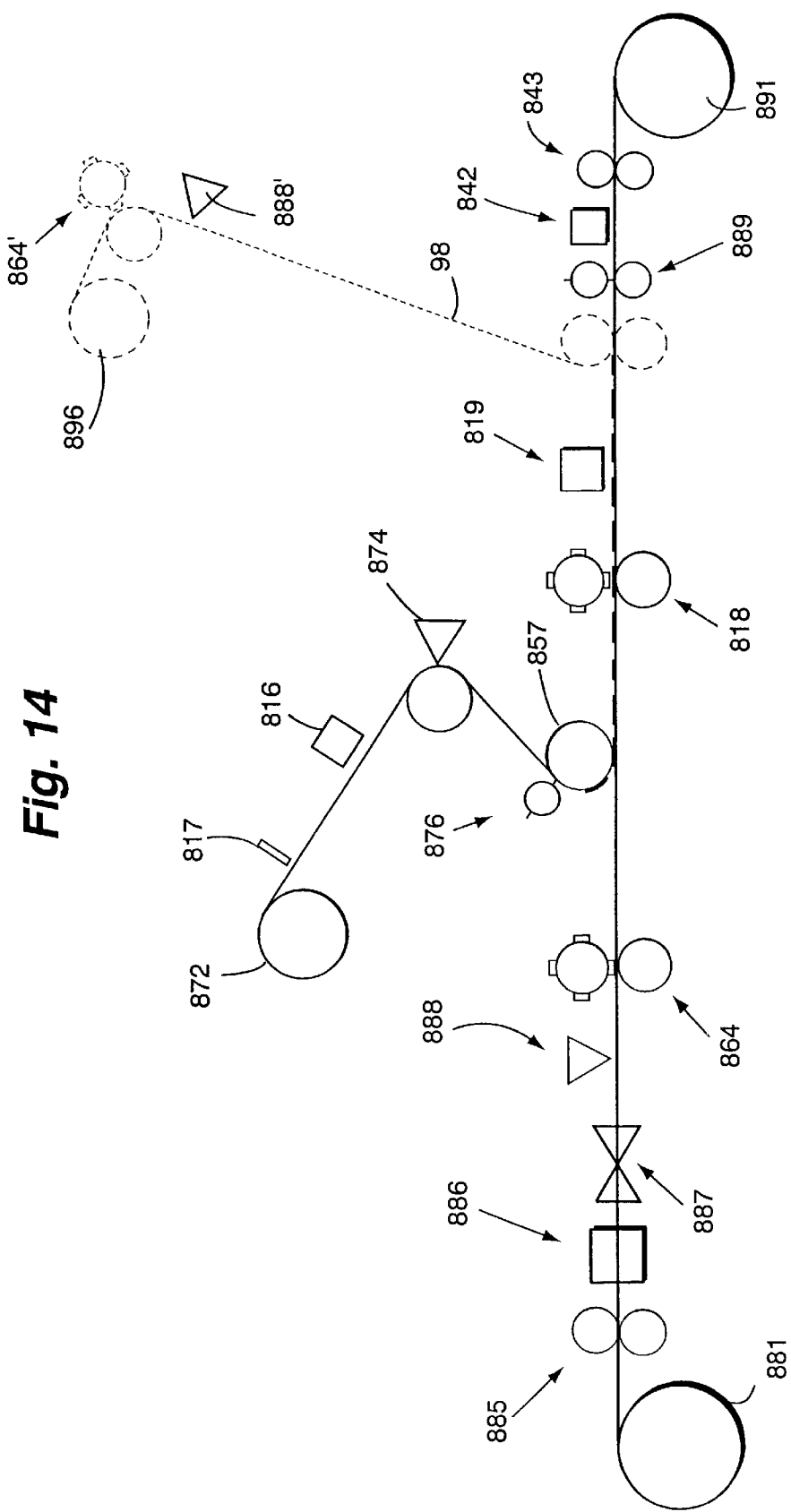
Figure 2:
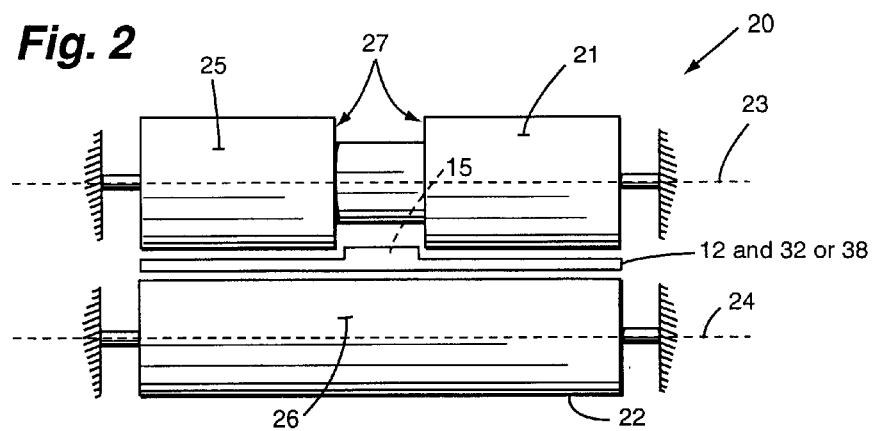
Figure 3:
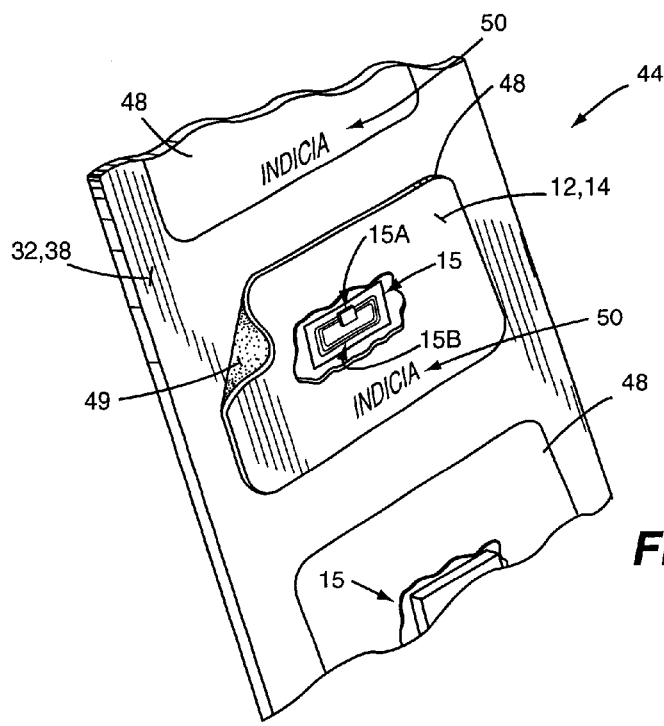
Figure 12:
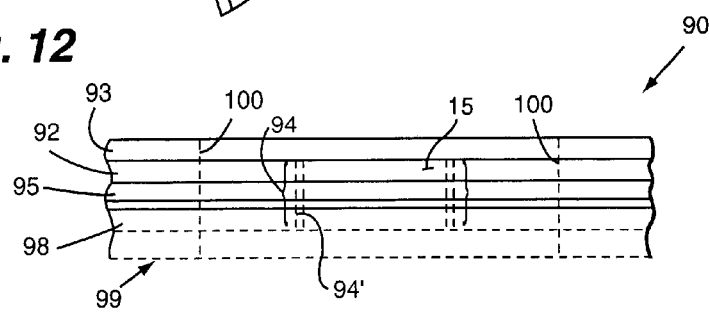

| Embodiment | Main Web Unwind | Tag Supply Unwind | Cover Web Unwind |
|---|---|---|---|
| FIG. 1 | | RFID Inlets on Paper | Jackfree Transfer Tape or Liner with Adhesive Coating |
| FIG. 4 | Label Laminate | Die Cut RFID Film Labels | Label Laminate Liner (Bottom) |
| FIG. 7 | Label Laminate | RFID Film Inlet Roll | Label Laminate Liner (Bottom) |
| FIG. 8 | Label Laminate | RFID Film Inlet Roll | Label Laminate Liner (Top) |
| FIG. 9 | Paper | RFID Film Inlet Linerless or Laminate | Jackfree Transfer Tape or Liner with Adhesive Coating |
| FIG. 10 | Label Laminate | RFID Film Inlet Linerless or Laminate | Label Laminate Liner (Top) |
| FIG. 11 | Paper | Die Cut RFID Film Labels | None (Linerless) |
| FIG. 13 | Paper | RFID Film Inlet Linerless or Laminate | None (Linerless) |
| FIG. 14 | Paper | RFID Film Inlet Roll | None (Linerless) |

In the method of FIG. 1, a roll 11 of paper 12 having RFID conventional inlets 15 thereon is provided as a first web. As seen in FIG. 3, each conventional inlet 15 comprises a conventional chip 15A and a conventional antenna 15B. The paper 12 has a bottom face 13 and a top face 14, the face 14 becoming the outward face of the labels subsequently produced.

The paper web 12 moves past a station 16 where conventional RFID read/writer equipment is provided. The equipment 16 practices at least one of verifying the functionality of, or programming, the chips 15A of inlets 15 prior to the formation of a composite web. Also preferably a conventional scanner 17 is utilized which may be an optical sensor or a proximity sensor, to sense the RFID inlets 15 prior to formation of a composite web so as to establish a registration signal for what will become each ultimate label.

roll 21, being provided only where inlets 15 will appear on the paper web 12.

The second web which is provided at the laminating station 20 may take the form of a roll 29 of transfer tape, with the first liner 30 removed therefrom and taken up on the liner rewind 31, while the second liner 32, with adhesive, passes into operative association with the lamination stage 20, with the adhesive from the second web 32, brought into contact with the face 13 of the paper web 12.

Alternatively, as illustrated in dotted line in FIG. 1, a roll 33 of simple liner material 34 may be provided which passes around a roll 35 and to which a hot melt pressure sensitive adhesive (or a like pressure sensitive adhesive) is applied utilizing the conventional applicator 36. The now adhesive-coated web passes around the release surface coated roll 37, the web 38 then being (after the roll 35) substantially the same as the web 32, and being laminated in the same way as indicated at stage 20.

The composite web 40 that is produced from the lamination stage 20 is then acted upon so as to make the composite web 40 into labels. For example as illustrated schematically at 41 in FIG. 1, conventional die cutting equipment 41 is utilized to die cut the composite web 40 into labels. Typically after die cutting at 41 a final RFID read verification stage 42 is provided, utilizing conventional equipment, and the web 40 passes through the rolls 43 at which variable indicia which is preferably imprinted on the RFID labels. The printing that takes place at 43 may be utilizing any conventional variable information printing technology, such as ink jet technology.

The final web 45 produced is either zigzag folded, or—as illustrated schematically in FIG. 1—taken up on a roll 45. The matrix material from the die cut stage 41 is removed as illustrated at 46 in FIG. 1, and typically taken up on a matrix rewind 47.

The RFID labels 48 according to the invention, on the label web 44 with matrix material removed, are illustrated schematically in FIG. 3. The top surface 12, 14 of each label 48 has indicia 50 (preferably variable indicia imaged at 43, and also possibly earlier imaged non-variable indicia) thereon. The back face of the labels 48 have pressure sensitive adhesive 49, from the liner with adhesive 32 or applied by the adhesive applicator 36, thereon which is readily released from the liner material 32, 38. Each inlet 15 is covered by the paper forming the web 12, which paper is cut away for the middle label 48 seen in FIG. 3 so as to illustrate the chip 15.

FIG. 4 illustrates another embodiment according to the present invention. Components in FIG. 4 comparable to those in FIG. 1 are shown by the same reference numeral only preceded by a "1", and the description thereof will not be repeated.

In the FIG. 4 embodiment the first web is in the form of RFID film labels from a roll 52, being shown at 53 with the inlets 15 thereon (previously produced RFID inlets 15 are provided die cut on a film carrier with pressure sensitive adhesive holding the inlet 15 to a release coated liner web). The first web 53 passes a conventional peel station where the inlets 15 on the labels 53, with adhesive, are peeled from the liner web with the adhesive face thereof ultimately coming into contact with the second web, by passage around a placing roll 57.

As indicated in Table I above, in the FIG. 4 embodiment preferably the main web unwind is a roll 59 of label laminate 60 comprising a face stock 61 and a liner 62 which are separated from each other as indicated in FIG. 4, with pressure sensitive adhesive 63 staying on the face stock 61 as it moves in a path around the equipment 52–57. As indicated schematically at 64 in FIG. 4 equipment acts on the third web 61, a face stock in this case, to form openings or recesses therein aligned with the inlets 15, and into which the inlets 15 are ultimately placed. After the inlets 15 in the form of labels spaced from each other are placed by the roller 57 onto the second web 62, they are ultimately mated with the third web 61 at the laminating station 120.

Figure 5:
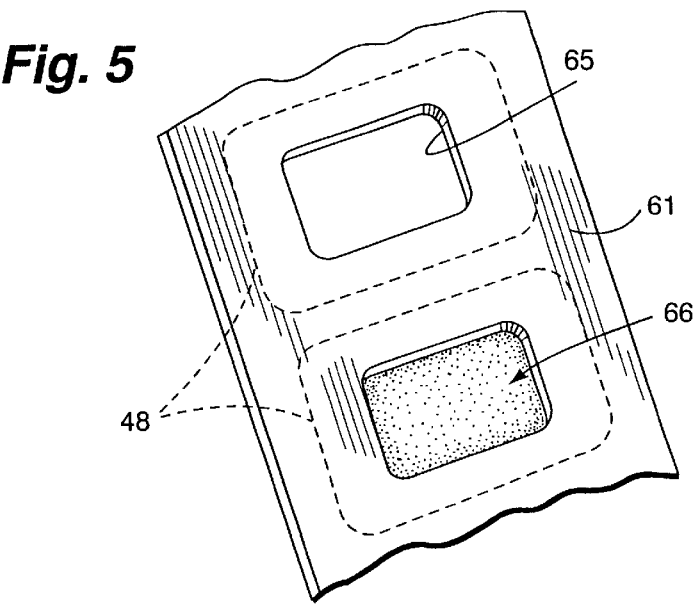
FIG. 5 is a schematic perspective view showing the face stock of the material of FIG. 4 after it has been die cut or calendered to provide chip-receiving openings or recesses therein.

FIG. 5 shows the third web 61 with an opening 65, or a calendered recess 66, formed therein. While both an opening 65 and recess 66 are illustrated in FIG. 5 typically the equipment 64 will only form openings or recesses but not both in the same web 61. The opening 65 is formed by die cutting while the recess 66 is formed by calendering. The openings/recesses 65, 66 are larger than an inlet 15, but smaller than the ultimate labels to be formed, shown in dotted line at 48 in FIG. 5. At the laminating stage 120 the inlets 15 enter the openings 65 or recesses 66.

Figure 6:
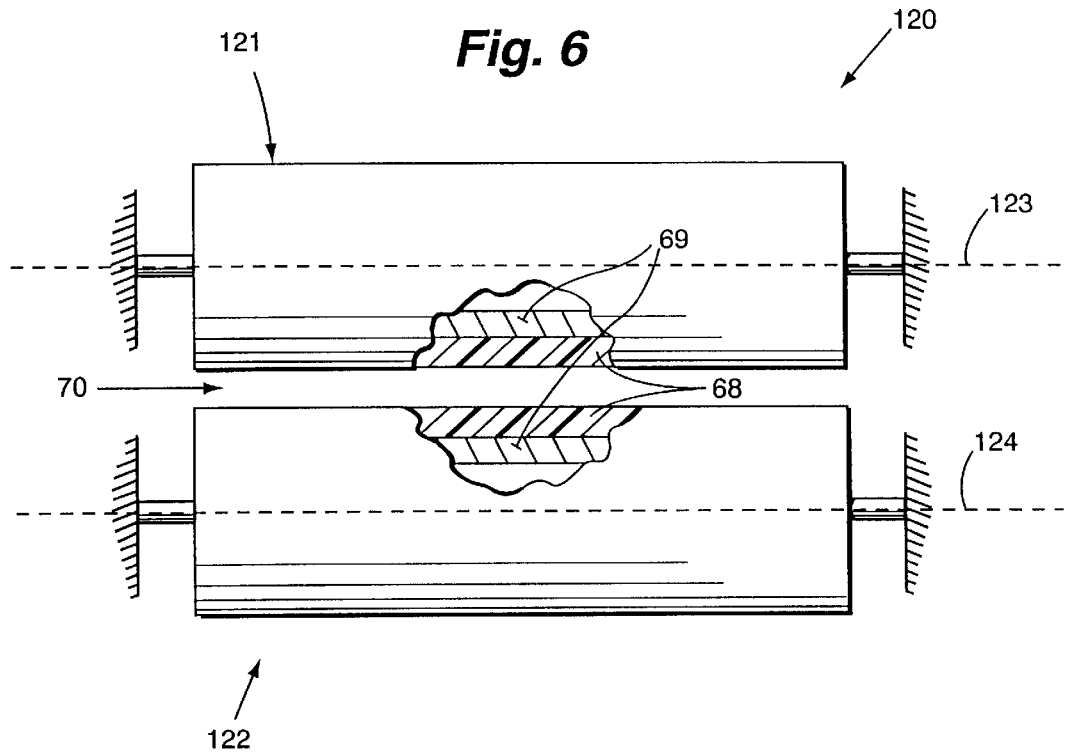
FIG. 6 is a view like that of FIG. 2 only showing a different configuration of laminating rolls that may be utilizable for practicing the method of FIGS. 1 and 4.

FIG. 6 shows a laminating stage 120 with a different type of laminating rollers, yet which will still prevent the inlets 15 from being harmed, compared to the embodiment of FIG. 2. In the FIG. 6 embodiment both rollers 121, 122 are shown having soft compressible material covering 68 (such as urethane foam), over a hard material core 69 or the like, which will deform sufficiently for the inlets 15 not to be harmed, while yet still having enough rigidity so as to apply pressure to provide a fully formed composite web 140.

In the FIG. 7 embodiment components comparable to those in the FIGS. 1 and 4 embodiments are shown by the same two digit reference numeral only preceded by a "2" and similarly for all subsequent embodiment figures but those in FIG. 8 preceded by a "3", those in 9 by a "4", those in 10 by a "5", those in 11 by a "6", those in 13 by a "7", and those in 14 by an "8".

In the embodiment of FIG. 7 the primary difference between it and the embodiment of FIG. 4 is the particular nature of the first web and associated equipment. RFID inlets 15 are previously produced in continuous form on a film carrier that is in a roll 72, the film carrier being shown at 73. A continuous adhesive coat may be provided on the face of the film carrier 73 opposite the inlets 15 by the conventional equipment illustrated at 74 in FIG. 7, or a spot coat adhesive coating may be provided by the conventional equipment illustrated at 75 on the second web (liner) 262, the spot coats being provided particularly where the RFID inlet chips 15 will be provided. The continuous film web 73 is cut into separate sheets as indicated by the conventional cutting equipment 76 in FIG. 7, and then the RFID inlet 15 sheets are placed by the roll 257 onto the second web/liner 262, and ultimately laminated with the third web 261 at the laminating station 220.

In the FIG. 8 embodiment, the primary difference between this embodiment and the FIG. 7 embodiment is that the face stock of the label laminate 359 the face stock 361 comprises a second web while the liner 362 comprises the first web. Also as indicated by the dotted line rolls near the reference numerals 359 and 362 in FIG. 8, optionally the original label laminate liner may be rewound and a new liner unwound in its place. Also in the FIG. 8 embodiment spot coat adhesive may be applied as indicated at 80 instead at 374, 375. Also if the RFID inlet 15 is small compared to the label size, no adhesive coating (that is no coating equipment 374, 375, 80) at all is an option.

In the FIG. 9 embodiment, the second web is provided from a paper roll 81 and the first web unwound from roll 452 may be RFID film inlets that are either linerless or if lined then the liner 82 can be rewound on the winder 83. The second web 81 is die cut or recessed by the equipment 464 and the RFID film from the roller 452 is cut into individual sheets which are placed adhesive side down by the placing roll 257 after cutting by the equipment 476 onto the second web 81. The third web may be provided over the inlets 415 by either the transfer tape web 432 or the adhesive coated liner web 438, with the webs 81, and 432 or 438 with the RFID inlets 15 sandwiched therebetween passing to the laminating station 420.

The FIG. 10 embodiment is similar to the FIG. 8 embodiment only the RFID film labels, in either linerless or lined form, such as shown in FIG. 9, are provided as the first web.

The FIG. 11 embodiment is one designed for producing linerless RFID labels. In this embodiment the paper face stock 681 has a UV silicone release coating (or other suitable adhesive release material) applied to a top face thereof as indicated at 85 in FIG. 11, the release material then being cured by the conventional UV cure equipment 80. The web 81 is turned using conventional web turn bars 87 or the like, and a conventional continuous pressure sensitive adhesive application is provided at station 88 to the opposite face that the silicone release coating was applied at 85. The equipment 664 then forms openings or calendered recesses in the web 81.

The RFID film labels from roll 652 are applied from the first web so that the chips 15A themselves are placed by the placing roll 657 in the openings or recesses (such as seen in FIG. 5) in the web 681. Ultimately the composite web formed by placing the RFID film labels from source 652 on the second web 681 are formed into individual labels by utilizing the conventional perforating equipment 89, to produce the linerless label web 90 which can be wound up on the roll 91 illustrated in FIG. 11.

The web 90 is seen schematically in an enlarged side view in FIG. 12. The adhesive release coating 93 is shown on top of the apertured or recessed label body 92 (formed from web 681), with the pressure sensitive adhesive coat 95 provided by the equipment 88, and with the inlet 15 within (in this embodiment) cut out openings 94 formed in the web base 92.

If desired an additional paper layer may be applied to form the label web 90, as illustrated in dotted line in FIGS. 11 and 12. The additional paper layer is taken up from the roll 96, openings or recesses are formed therein using the equipment 664', adhesive is applied utilizing the equipment 88', and the web 98 resulting therefrom passes through laminating rolls 620 as seen in FIG. 11 then, the additional paper layer 98 is secured by the adhesive 95 to the first paper layer 92, with each inlet 15 also entering an opening 94', and with the pressure sensitive adhesive 99 at the bottom of the linerless label web 90. The perforations introduced by the perforating equipment 89, forming the web 90 into individual labels, are indicated by the dotted lines 100 in FIG. 12.

The FIG. 13 embodiment is like that of FIG. 11 only instead of utilizing the RFID film labels 652 a RFID film inlets web, either linerless or lined, 752 is provided, the film web being cut at 776 before being placed by the roll 757.

The FIG. 14 embodiment is the same as the FIG. 13 embodiment only the RFID inlets are provided as the web 872 to which adhesive 874 is applied before cutting at 876 and placing by the roll 857.

In all of the embodiments illustrated in FIGS. 1, 4, 7 through 11, 13 and 14 because all conventional equipment, per se, is utilized, the systems for practicing the methods are easy to construct and cost effective, and operate in a simple yet effective manner. Also because web handling is provided utilizing conventional web moving equipment, the methods may be practiced at high speed, for example at least about 100 feet per minute web speed, even up to about 300 ft./min., making the methods even more cost effective.

While the invention has been herein shown and described in what is presently conceived to be the most practical and preferred embodiments thereof it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of making RFID labels, comprising:
    (a) providing a plurality of RFID inlets, each including a chip, on a first web;
    (b) covering the RFID inlets with a second web to provide a composite web;
    (c) providing pressure sensitive adhesive on a portion of one of the webs that will be an exterior portion of a label once ultimately formed;
    (d) at least one of verifying the functionality of, or programming, the chips prior to formation of the composite web; and
    (e) acting on the composite web so as to provide the composite web into labels having a top face, and a bottom face with pressure sensitive adhesive,
    wherein (b) is practiced by laminating the first and second webs by passing them between laminating rolls without harming the inlets, wherein (b) is practiced without harming the chips by providing a recess in at least one of the laminating rolls in alignment with the inlets.

2. A method as recited in claim 1 further comprising sensing the RFID chips or inlets prior to formation of the composite web so as to establish a registration signal for what will become each label.

3. A method as recited in claim 1 further comprising (f) making a final RFID chip read verification after (e).

4. A method as recited in claim 1 wherein (e) is practiced by die cutting the labels from one of the webs to provide a plurality of labels and matrix material on a liner, and removing the matrix material from the labels on the liner.

5. A method as recited in claim 1 further comprising applying a coating of adhesive release material to one of the webs, opposite the pressure sensitive adhesive; and wherein (e) is practiced by perforating the composite web to form a plurality of linerless labels.

6. A method as recited in claim 1 wherein (a) is practiced using a paper web as the first web, and wherein (b) is practiced using transfer tape, or a liner which coated with pressure sensitive adhesive prior to engagement between the webs, as the second web.

7. A method as recited in claim 1 further comprising (f) imaging variable indicia on the top face of said labels, and (a)–(e) are practiced at a rate of at least about 100 ft./minute.

8. A method as recited in claim 7 wherein (f) is practiced after (e).

9. A method as recited in claim 1 wherein (b) is practiced by cutting the first web to provide separate sheets each having an inlet, and placing the sheets onto the second web.

10. A method as recited in claim 9 wherein (b) is further practiced by placing the sheets onto adhesive on the second web.

11. A method as recited in claim 9 wherein (b) is further practiced by laminating a third web onto the composite web so that the sheets with inlets are disposed between the second and third webs by passing the webs between laminating rolls to sandwich the chips between the second and third webs.

12. A method as recited in claim 11 further comprising (f) forming openings or recesses in the third web aligned with the inlets, and wherein (b) is further practiced by insuring that the inlets enter the openings or recesses in the third web.

13. A method as recited in claim 12 wherein (f) is practiced by die cutting openings in the third web.

14. A method as recited in claim 12 wherein (f) is practiced by calendering recesses in the third web.

15. A method as recited in claim 1 wherein (a) is practiced using RFID film.

16. A method as recited in claim 15 wherein (b) is practiced by separating a face stock and liner of a label laminate, and using one of the face stock or liner as the second web and the other as a third web; and further comprising, after (b), (g) laminating the third web onto the composite web with the first web and RFID inlets between the second and third webs by passing the webs between laminating rolls to sandwich the chips between the second and third webs.

17. A method as recited in claim 16 further comprising (g) forming openings or recesses in the third web aligned with the inlets, and wherein (f) is further practiced by insuring that the inlets enter the openings or recesses in the third web.

18. A method as recited in claim 17 further comprising (h) imaging variable indicia on the top face of the labels after (e); (i) sensing the RFID inlets prior to formation of the composite web so as to establish a registration signal for what will become each label; (j) making a final RFID chip read verification after (e).

* * * * *

UNITED STATES PATENT AND TRADEMARK OFFICE
CERTIFICATE OF CORRECTION

PATENT NO.   : 6,451,154 B1
DATED        : September 17, 2002
INVENTOR(S)  : Grabau et al.

It is certified that error appears in the above-identified patent and that said Letters Patent is hereby corrected as shown below:

Drawings,
Sheet 2 of 11, delete Figure 12 replace with corrected Figure 12 as shown on attached page.

Column 7,
Line 4, "UV cure equipment 80" should be -- UV cure equipment 86 --.

Signed and Sealed this

Twentieth Day of May, 2003

JAMES E. ROGAN
*Director of the United States Patent and Trademark Office*